(12) United States Patent
Reitmeier et al.

(10) Patent No.: US 7,801,306 B2
(45) Date of Patent: *Sep. 21, 2010

(54) SECURE INFORMATION DISTRIBUTION SYSTEM UTILIZING INFORMATION SEGMENT SCRAMBLING

(75) Inventors: Glenn Arthur Reitmeier, Yardley, PA (US); Michael Tinker, Yardley, PA (US)

(73) Assignee: Akikaze Technologies, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/255,521

(22) Filed: Oct. 21, 2008

(65) Prior Publication Data

US 2009/0041235 A1    Feb. 12, 2009

(51) Int. Cl.
*H04N 7/167* (2006.01)

(52) U.S. Cl. .................. 380/217; 380/210; 380/240; 725/31; 386/112

(58) Field of Classification Search .......... 380/210, 380/217, 240; 725/31; 386/112
See application file for complete search history.

(56) References Cited

U.S. PATENT DOCUMENTS

| | | | |
|---|---|---|---|
| 4,736,420 A | 4/1988 | Katznelson et al. | 380/215 |
| 4,742,544 A | 5/1988 | Kupnicki et al. | 380/215 |
| 4,947,447 A | 8/1990 | Miyaoka et al. | 382/246 |
| 5,014,310 A | 5/1991 | Walker et al. | 380/215 |
| 5,049,990 A | 9/1991 | Kondo et al. | 375/240.24 |
| 5,113,443 A | 5/1992 | Brockman | 380/34 |
| 5,115,469 A | 5/1992 | Taniguchi et al. | |
| 5,144,663 A | 9/1992 | Kudelski et al. | |
| 5,195,134 A | 3/1993 | Inoue | 380/242 |
| 5,341,457 A | 8/1994 | Hall, II et al. | |
| 5,351,299 A | 9/1994 | Matsuzaki et al. | 380/37 |
| 5,392,072 A | 2/1995 | Rodriguez et al. | 375/240.03 |
| 5,420,866 A | 5/1995 | Wasilewski | 370/426 |
| 5,479,512 A | 12/1995 | Weiss | 380/28 |
| 5,546,461 A | 8/1996 | Ibaraki et al. | 380/217 |
| 5,621,799 A | 4/1997 | Katta et al. | 380/217 |
| 5,625,416 A | 4/1997 | Tseng et al. | 348/388.1 |
| 5,701,391 A | 12/1997 | Pan et al. | 704/212 |
| 5,706,346 A | 1/1998 | Katta et al. | 380/217 |
| 5,734,755 A | 3/1998 | Ramchandran et al. | 382/250 |
| 5,761,634 A | 6/1998 | Stewart et al. | |
| 5,764,994 A | 6/1998 | Craft | 717/159 |

(Continued)

FOREIGN PATENT DOCUMENTS

EP    0 630 158    5/1996

(Continued)

OTHER PUBLICATIONS

Chen, et al., "Coding of Subregions for Content-Based Scalable Video," IEEE Transactions on Circuits and Systems For Video Technology, 1997, 7(1), 256-260.

(Continued)

*Primary Examiner*—Michael Pyzocha
*Assistant Examiner*—Paul Callahan
(74) *Attorney, Agent, or Firm*—Woodcock Washburn LLP

(57) ABSTRACT

A method and apparatus for securing and, optionally, distributing an information stream by divided the information stream into a collection of segments and compressing the segments, rearranging the order of the segments and encrypting the segments.

23 Claims, 5 Drawing Sheets

U.S. PATENT DOCUMENTS

| | | | |
|---|---|---|---|
| 5,802,520 | A | 9/1998 | Jerkunica et al. ............ 707/101 |
| 5,862,178 | A | 1/1999 | Jarvinen et al. |
| 5,926,624 | A | 7/1999 | Katz et al. ................. 709/217 |
| 5,974,380 | A | 10/1999 | Smyth et al. |
| 6,012,024 | A | 1/2000 | Hofmann |
| 6,035,068 | A | 3/2000 | Imai ....................... 382/232 |
| 6,041,160 | A | 3/2000 | Yagasaki et al. .............. 386/94 |
| 6,061,451 | A | 5/2000 | Muratani et al. ............ 380/201 |
| 6,064,748 | A | 5/2000 | Hogan ....................... 382/100 |
| 6,081,785 | A | 6/2000 | Oshima et al. ................. 705/1 |
| 6,098,039 | A | 8/2000 | Nishida |
| 6,101,195 | A | 8/2000 | Lyons et al. ................ 370/498 |
| 6,157,606 | A | 12/2000 | Inazawa et al. ............ 369/116 |
| 6,266,299 | B1 | 7/2001 | Oshima et al. ............ 369/13.38 |
| 6,285,774 | B1 | 9/2001 | Schumann et al. .......... 382/100 |
| 6,349,088 | B1 | 2/2002 | Ginzboorg et al. .......... 370/230 |
| 6,392,705 | B1 | 5/2002 | Chaddha .................. 348/388.1 |
| 6,529,553 | B2 | 3/2003 | Nguyen et al. ......... 375/240.22 |
| 6,594,626 | B2 | 7/2003 | Suzuki et al. |
| 6,694,293 | B2 | 2/2004 | Benyassine et al. |
| 7,003,449 | B1 | 2/2006 | Absar et al. |
| 7,352,811 | B2 | 4/2008 | Stone et al. |
| 7,363,231 | B2 | 4/2008 | Kikuiri et al. |
| 7,457,415 | B2 * | 11/2008 | Reitmeier et al. ........... 380/210 |
| 2005/0080622 | A1 | 4/2005 | Dieterich et al. |

FOREIGN PATENT DOCUMENTS

| | | |
|---|---|---|
| EP | 0 710 025 | 9/2000 |
| EP | 1 110 401 | 2/2007 |
| JP | 64-25633 | 1/1989 |
| JP | 5-244591 | 9/1993 |
| JP | 8-97811 | 4/1996 |
| JP | 8-204857 | 9/1996 |
| JP | 9-214930 | 8/1997 |
| JP | 9-307891 | 11/1997 |
| JP | 10-65652 | 3/1998 |
| JP | 10-117173 | 5/1998 |
| JP | 10-200877 | 7/1998 |
| JP | 10-215244 | 8/1998 |
| WO | 97/47139 | 12/1997 |
| WO | 98/27553 | 6/1998 |
| WO | WO 00/11870 | 3/2000 |
| WO | WO 2005/020210 | 3/2005 |

OTHER PUBLICATIONS

The Microsoft Press Computer Dictionary, 1997, Microsoft Press, 3$^{rd}$ Ed., p. 421.

Japanese Patent Application No. 2000-567019, Office Action dated Apr. 24, 2009.

Japanese Patent Application No. 2000-567019, Decision of Rejection dated Nov. 13, 2009.

PCT International Search Report mailed Jan. 12, 2000, in corresponding Application No. PCT/US99/18417.

PCT International Preliminary Report on Patentability issued Mar. 14, 2001, in corresponding Application No. PCT/US99/18417.

EP Communication from the Examining Division dated Aug. 25, 2005, in corresponding Application No. EP99941111.9.

United States Patent and Trademark Office: Non-Final Office Action dated Jun. 14, 2000, U.S. Appl. No. 09/182,933.

United States Patent and Trademark Office: Final Office Action dated Nov. 20, 2000, U.S. Appl. No. 09/182,933.

United States Patent and Trademark Office: Non-Final Office Action dated Jun. 29, 2001, U.S. Appl. No. 09/182,933.

United States Patent and Trademark Office: Non-Final Office Action dated Dec. 18, 2001, U.S. Appl. No. 09/182,933.

United States Patent and Trademark Office: Final Office Action dated Jun. 4, 2002, U.S. Appl. No. 09/182,933.

United States Patent and Trademark Office: Non-Final Office Action dated Nov. 21, 2002, U.S. Appl. No. 09/182,933.

United States Patent and Trademark Office: Final Office Action dated May 6, 2003, U.S. Appl. No. 09/182,933.

United States Patent and Trademark Office: Non-Final Office Action dated Nov. 21, 2003, U.S. Appl. No. 09/182,933.

United States Patent and Trademark Office: Final Office Action dated May 3, 2004, U.S. Appl. No. 09/182,933.

United States Patent and Trademark Office: Non-Final Office Action dated Mar. 20, 2008, U.S. Appl. No. 09/182,933.

United States Patent and Trademark Office: Notice of Allowance dated Apr. 7, 2008, U.S. Appl. No. 09/182,933.

United States Patent and Trademark Office: Notice of Allowance dated Jul. 21, 2008, U.S. Appl. No. 09/182,933.

* cited by examiner

SECURE INFORMATION DISTRIBUTION SYSTEM UTILIZING INFORMATION SEGMENT SCRAMBLING

RELATED APPLICATIONS

This application claims the benefit of: U.S. Provisional Application No. 60/097,264, filed Aug. 20, 1998, which is herein incorporated by reference in its entirety; and U.S. patent application Ser. No. 09/182,933, now U.S. Pat. No. 7,457,415, filed Oct. 30, 1998, which is herein incorporated by reference in its entirety.

TECHNICAL FIELD

The invention relates to information distribution systems and, more particularly, the invention relates to methods and apparatus for securing information distributed within an information distribution system.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable length digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

Present electronic distribution systems typically do not strike an appropriate balance between flexibility and security for the purposes of some information distribution applications. For example, to enable the electronic distribution of motion pictures (i.e., film) and other entertainment video applications, it is necessary to dynamically process "trailers" (i.e., short previews of coming attractions") on a location by location basis, in addition to full length motion pictures. With respect to security, it is obviously necessary to incorporate a high level of security, ideally using a multi-layer security approach, such that the valuable intellectual property transmitted within the system is not compromised.

Therefore, a need exists in the art for a secure and flexible method and apparatus for distributing information such as high-value motion pictures and other audio-video information, as well as other forms of data. Additionally, it is seen to be desirable to provide enhanced security for various media, such as digital versatile disk (DVD) and other media.

SUMMARY OF THE INVENTION

A method and apparatus for securing and, optionally, distributing an information stream by divided the information stream into a collection of segments and compressing the segments, rearranging the order of the segments and encrypting the segments prior to, e.g., distributing the encrypted segments to one or more users within an information distribution system.

Specifically, in one embodiment of the invention, an input information stream is divided into a collection of information segments, the individual segments are then compressed and arranged in a non-standard (i.e., scrambled) manner to produce a scrambled collection of information segments and an associated index table suitable for use in rearranging the collection of information segments into a standard (i.e., unscrambled) order. The scrambled collection of information segments and the associated index table are encrypted (using the same or different encryption techniques) and distributed to one or more subscribers (using the same or different distribution channels). Optionally, the scrambled collection of information segments is distributed using a plurality of distribution channels (i.e., multipath distribution) and/or at a plurality of different times (i.e., temporally staggered distribution).

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of an MPEG-like information distribution system. It will be recognized by those skilled in the art that the invention is applicable to many types of information distribution systems. More specifically, the invention is ideally suited to the protection and dissemination of information streams comprising related sequenced of video and/or audio information, such as motion pictures, television and the like.

Figure 1:
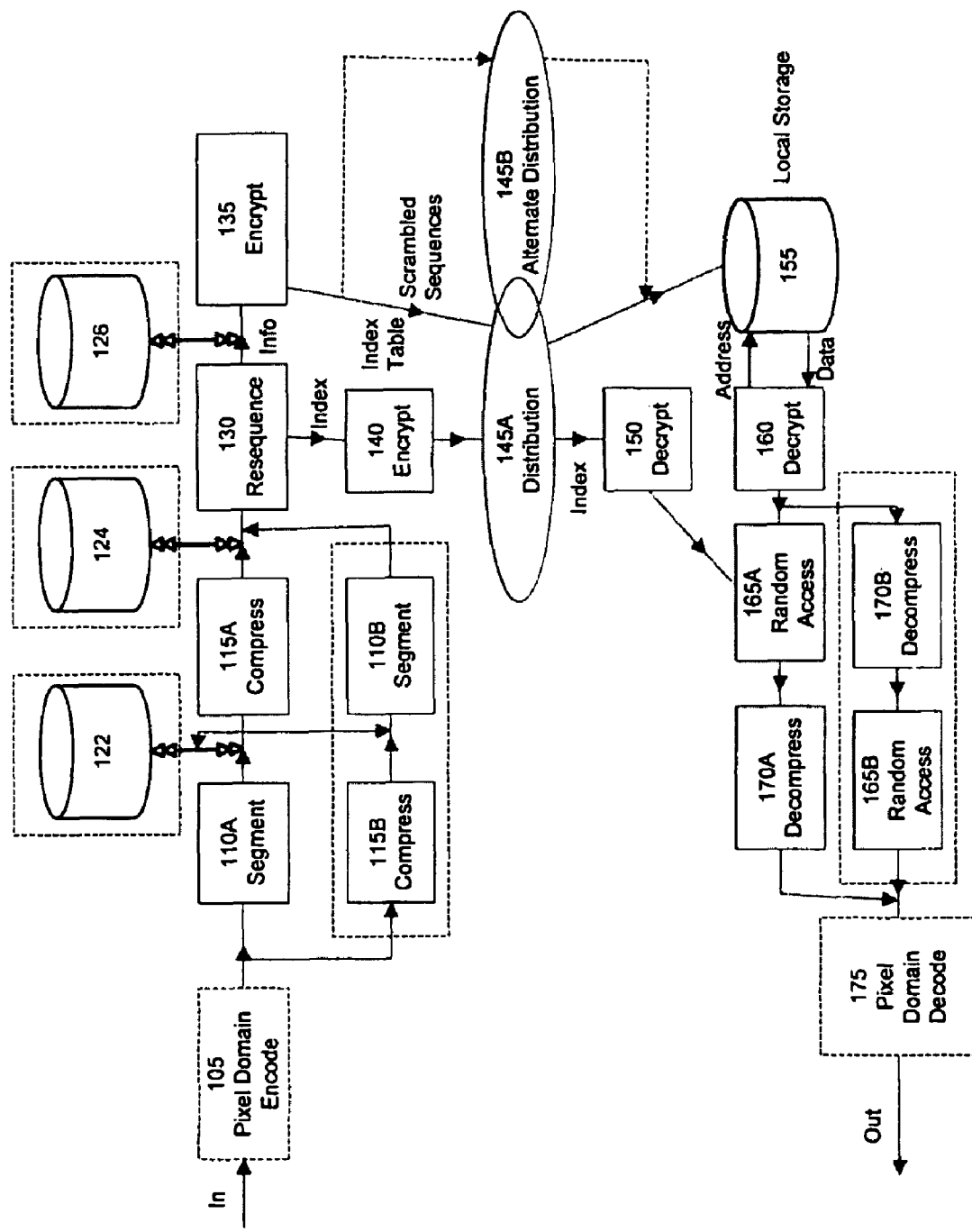
FIG. 1 depicts an information distribution system 100 including apparatus according to the invention.

FIG. 1 depicts an information distribution system 100 including apparatus according to the invention. Specifically, FIG. 1 depicts an information distribution system 100 comprising information provider equipment (105-140), information distribution channels (145A and 145B), and subscriber equipment (150-175). The information distribution system 100 receives an input information stream IN', illustratively an audio-visual information stream such as a motion picture video stream and one or more associated audio or data streams. The input information stream IN' is processed by the provider equipment to produce a secure information stream that is coupled to the subscriber equipment via the information distribution channel(s). The secure information stream is received and processed by the subscriber equipment to produce an output information stream OUT' comprising the initial audio-visual information stream IN'.

In one embodiment of the invention, a movie or other program is compressed as a collection of self-contained MPEG-2 sequences, which may be of non-uniform duration and size (number of bits). For distribution/storage, the sequences may be arbitrarily re-ordered and an index table built that contains pointers to the storage locations of sequences ordered in their correct presentation sequence. The reordered sequences may be encrypted using standard encryption techniques. The index table may be separately encrypted using the same or different encryption techniques. In addition, the index table may be distributed using a different medium. For example, the encrypted and re-ordered sequences may be distributed on a DVD-ROM, while the encrypted index table is downloaded to the receiver/decoder from an on-line server. Alternatively, a smart card could be used for the index table. Many variations are possible. At the receiver, the decrypted index table is used to control the random access readout of the encrypted sequences from the storage medium. The video sequences are decrypted, decompressed and displayed in their proper order.

The index table approach not only achieves scrambling, but it also provides an approach to flexibly accommodate trailers. The re-ordered video storage distributed to all locations would contain all trailers. The index table distributed to a particular location may indicate the desired subset of trailers. In this manner, the index table and reordering approach provides both multi-level security and trailer-handling flexibility.

It should be noted that within the scope of this invention, video and audio may be separately segmented and independently re-ordered, with separate index tables for each. Similarly, separate video components (e.g., R, G and B) may also be treated separately.

The information provider equipment within the information distribution system 100 of FIG. 1 comprises an optional pixel domain encoder module 105, a segmentation module 110, a compression module 115, a re-sequencing module 130, an information stream encryption module 135, an index table encryption module 140, and a plurality of optional provider storage modules 122, 124 and 126.

The optional pixel domain encoder 105 receives and processes the input information stream IN' according to one or more of a plurality of pixel domain (or audio domain) processing techniques. These techniques will be described in more detail below with respect to FIG. 3. As an example, the optional pixel domain encoder 105 may impart a digital watermarking to video information within the received input information stream IN' such that copyright notices, source designation and other information related to, e.g., the allowable use and/or ownership of the input information stream IN' may be inserted. The pixel domain encoder 105 produces a pixel (or audio) domain encoded information stream IN that is coupled to the segmentation module 110. It should be noted that within the context of this disclosure, the term "pixel domain" is used to denote more than the pixel or baseband video or image information. The term "pixel domain" is used to additionally denote audio and other information (i.e., data) associated with the pixel or baseband video or image information of the underlying information stream being processed.

The segmentation module 110 divides the encoded (or unencoded) information stream IN into a plurality of segments to produce a segmented information stream. The segmented information stream is then coupled to compression 115A and, optionally, stored in a first provider storage module 122. That is, the segmentation module 110 "chops" the input information stream IN into a plurality of information segments of the same or different lengths according to one or more of a plurality of criteria. The criteria will be described in more detail below with respect to FIG. 3.

In one embodiment of the invention, the segmentation module 110 may arbitrarily "chop" the input information stream IN into segments of, e.g., 1000 packets up to an appropriate stream splicing exit point. In another embodiment of the invention, the segmentation module 110 delineates a predefined, approximate number of frames (e.g., approximately 100 or 1000 frames) within a video stream. The selected segment of frames includes those frames immediately preceding a scene cut (e.g., those frame immediately preceding an I-frame). In still another embodiment of the invention, the segmentation module 110 an approximate number of video frames and associated audio frames are selected such that the segment thereby formed includes all the audio frames associated with the video segment (i.e., no audio frames in one segment that are related to video frames in another segment).

It is desirable to avoid leaving "clues" to the scrambling process, such that a hacker might be able to piece together the various segments. For example, audio frames having known associations to video frames may be used to reconstruct the appropriate arrangement of the video frames. That is, discontinuities within the audio track (i.e., a break within the middle of a musical note or tone) may be matched together to reconstruct a video segment. Therefore, in one embodiment of the invention the audio frames are segmented separately from the video frames.

The segment size is determined with respect to the security level desired (i.e., more or smaller segments yields greater security), the structure of the underlying information (i.e., fixed or variable group of pictures, frequent video scene cuts and the like).

The compression module 115A compresses the segmented information stream according to, e.g., an MPEG or other compression scheme, depending upon the type of information being distributed. For example, in the case of the input information stream in comprising a video information stream and associated audio information stream (e.g., a motion picture), compression module 115A may be used to encode the video information according to an MPEG-2 compression technique, and the audio information according to an AC-3 or other audio encoding technique. Compression module 115A produces a compressed information stream that is coupled to re-sequencing module 130 and, optionally, stored in a second provider storage module 124.

It should be noted that the order of segmentation module 110A and the compression module 115A may be reversed. Thus, in FIG. 1, an alternate processing path for the input information stream IN is provided in which a compression module 115B is used to process the input information stream IN prior to segmentation by a segmentation module 110B.

Re-sequencing module 130 rearranges the compressed information segments according to a predetermined or pseudo-random pattern. That is, re-sequencing module 130 "shuffles" the compressed and segmented information stream to produce a reordered or re-sequenced compressed and segmented information stream and an associated index table indicative of the re-sequencing operation performed upon the compressed and segmented information stream. The re-sequencing module 130 re-sequences the underlying video and/or audio information according to one or more of several criteria, such as scene boundaries, GOP size, temporal or frame displacements, frame count, and the like. The re-sequenced compressed and segmented information stream is coupled to the information stream encryption module 135, while the associated index table is coupled to the index table encryption module 140. Optionally, the output of re-sequencing module 130 is coupled to third local storage module 126.

It is critical to the understanding of the present invention to note that the purpose of the segmentation module 110A and the re-sequencing module 115A is to rearrange, in a seemingly random manner, e.g., the video and/or audio information associated with an underlying audio-video information stream such that the presentation continuity of the underlying audio-video information is destroyed. That is, the segmentation module 110A and the re-sequencing module 115A remove the temporal continuity of the underlying audio video information in a manner that renders the audio-video information unusable, or at least unenjoyable, to a pirate or unauthorized subscriber.

The information stream encryption module 135 scrambles the re-sequenced compressed and segmented information stream using one or more known scrambling techniques. Additionally, the index table produced by re-sequencing module 130 is coupled to another encryption module 140, where it is encrypted in one of a number of known manners to produce an encrypted index table. The encrypted information stream (i.e., the scrambled re-sequenced, compressed and segmented information stream) and the encrypted index table are coupled to information consumer or subscriber side equipment via, e.g., distribution network 145 and/or alternate distribution network 145A.

The optional first 122, second 124 and third 126 local storage module 126 are used to store, respectively, the output of segmentation module 110A (or compression module 115B), the output of compression module 115A (or segmentation module 110B) and the output of re-sequencing module 130. The local storage modules may be used to, e.g., store such information for further processing by additional processing devices (not shown) or to allow processing of an entire information stream at each step (e.g., perform all segmentation of a received input information stream IN, then perform all compression of the segmented information stream, then perform all re-sequencing of the compressed and segmented information stream, etc.). Optionally, the server side equipment may be used as a temporary buffer during a "one pass" processing of an input information stream IN (such as a live broadcast of a baseball game).

Distribution network 145A and alternate distribution network 145B may comprise any one of a number of standard distribution networks such as, microwave links, fiber optic networks, satellite links, cable television links, DVD, Internet, broadcast and the like.

In one embodiment of the invention an alternate distribution network 145B is utilized to transport some of all of the scrambled sequences produced by encryption module 135. That is, the alternate distribution network 145B may be used to transport, e.g., every fifth or some other portion of the scrambled sequences produced by the encryption module 135. In this manner, an unauthorized user intercepting the information carried by distribution network 145A would, even in the case of breaking the various encrypt codes and properly re-sequencing the scrambled segments, be unable to retrieve all of the scrambled sequences. Thus, alternate distribution network 145B provides an additional layer of security within the information distribution system 100 if FIG. 1.

The subscriber side equipment within the information distribution system 100 of FIG. 1 comprises a local storage module 155, a decryption module 150, a second decryption module 160, a random access module 165, a decompression module 170 and an optional pixel domain decoding module 175.

The local storage module 155 receives the scrambled sequences transported by distribution network 145A and/or 145B and stores the scrambled sequences. The first decryption module 150 is used to decrypt the encrypted index table transported by distribution network 145A to produce a decrypted index table. The decrypted index table is coupled to random access module 165. Second decryption module 160 accesses local storage module 155 to retrieve scrambled sequences that are stored and, responsively, decrypt those scrambled sequences. The decrypted scrambled sequences (i.e., unscrambled sequences) are then coupled to random access module 165. Random access module 165 utilizes the index table information received from first decryption module 150 to rearrange the descrambled sequences received from decryption module 160 to produce a properly sequenced information stream at an output. That is, the output of random access module 165 comprises an information stream having a plurality of segments that are arranged in a manner providing continuity within the underlying, illustratively, audio visual information stream. Decompression module 170 receives the information stream produced by random access module 165 comprising correctly arranged information segments and, responsively, decompresses the received information stream to produce one or more output information streams (i.e., an audio information stream, a video information stream and any ancillary data streams). The output information stream OUT is optionally subjected to pixel domain decoding module 175, where a pixel domain decode process that is inverse of the pixel domain encoding process performed by pixel encoder 105 occurs.

Figure 2:
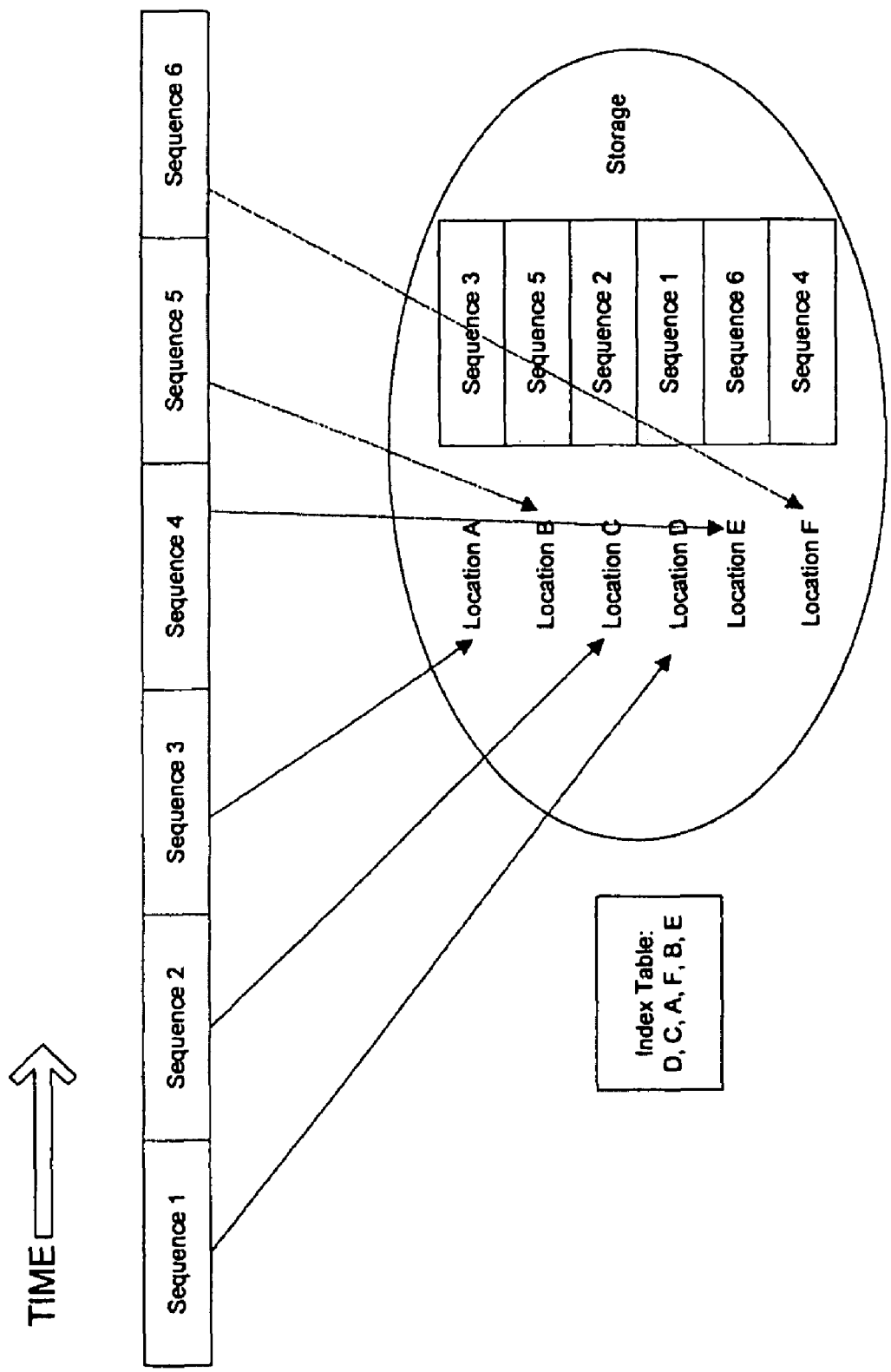
FIG. 2 depicts a graphic representation of collection of information segments arranged in a non-standard (i.e., scrambled) order, and an index table suitable for use in rearranging the collection of information segments into a standard (i.e., unscrambled) order.

FIG. 2 depicts a graphic representation of collection of information segments arranged in a non-standard (i.e., scrambled) order, and an index table suitable for use in rearranging the collection of information segments into a standard (i.e., unscrambled) order. In the graphic representation of FIG. 2, the collection of information segments are stored in a memory such as local storage unit 155 of the system 100 of FIG. 1, and the index table comprises a list of storage locations from which to read, in order, to reconstruct the original order of the information segments. In this manner, improperly obtained distributed data that is scrambled is not useful unless the index table is also obtained.

Specifically, FIG. 2 depicts an association between six locations (A-F) and six sequences (sequence 1-sequence 6). It should be noted that in FIG. 2 an oval indicative of a storage module is shown containing a table associating the locations and sequences. Specifically, location A is associated with sequence 3, location B is associated with sequence 5, location C is associated with sequence 2, location D is associated with sequence 1, location E is associated with sequence 6 and location F is associated with sequence 4. Thus, an index table comprising the following sequence {D, C, A, F, B, E} indicates that the sequence is stored in memory should be retrieved, prior to being utilized, according to the associations described above to produce a properly sequenced information stream.

Figure 3:
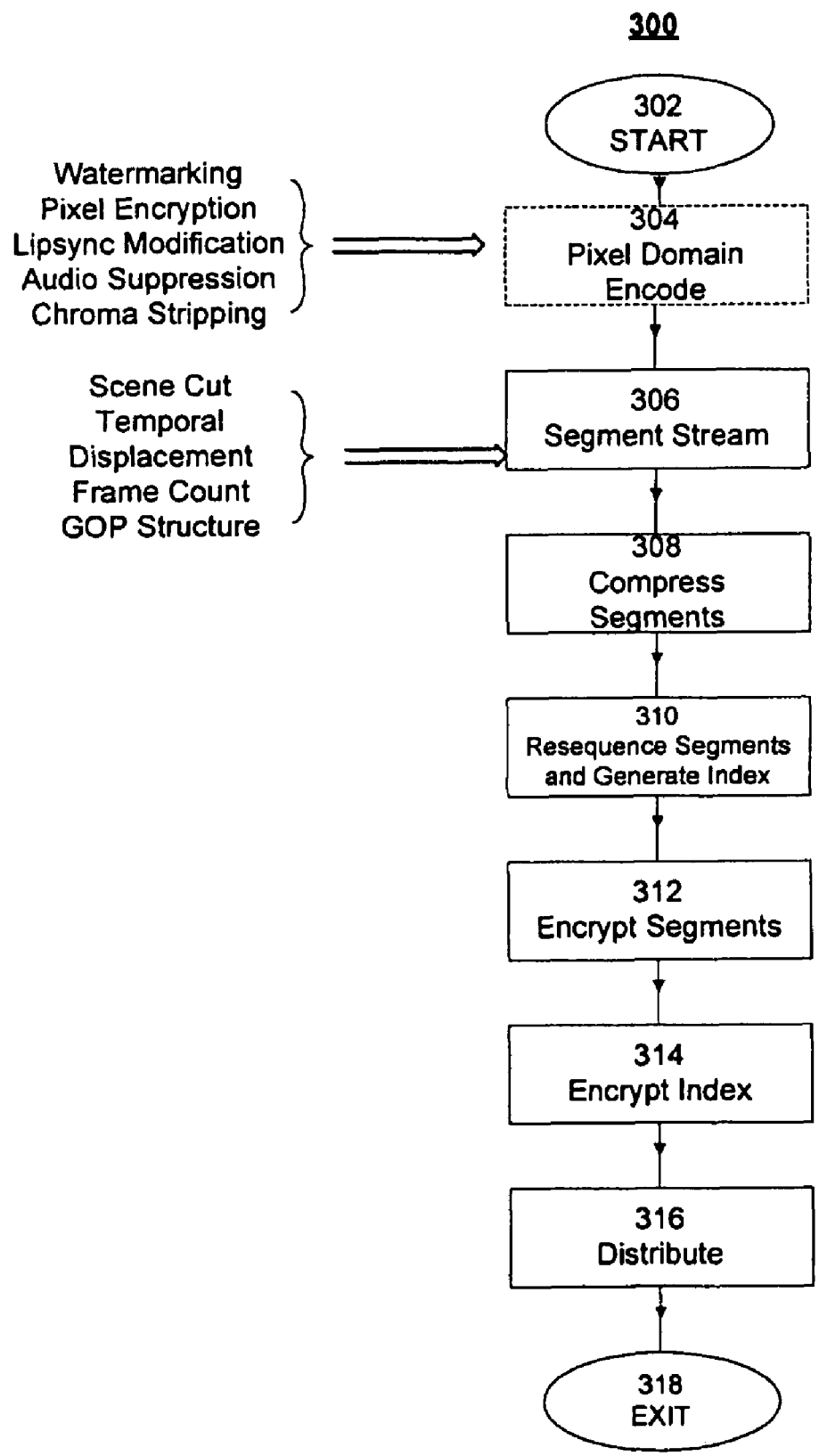
FIG. 3 depicts a flow routine of an information provider processing method according to the invention.

FIG. 3 depicts a flow routine of an information provider processing method according to the invention. The routine 300 depicted in FIG. 3 is directed towards processing an audio video stream to produce a segmented, encoded, re-sequenced and encrypted audio and video information stream and associated index information suitable for re-sequencing the segments.

The routine 300 is entered at step 302 and proceeds to step 304. At step 304 an optional pixel domain encoding process is performed on the video information within a received audio video information stream. For example, the pixel domain encoding process of step 304 may comprise a watermarking process, a pixel encryption process, a lip sync modification process, an audio suppression process or a chroma stripping process. Watermarking involves the insertion of identifying an issue within video portion of an information stream such that copyright and other source indicative information may be included within a distributed information stream. Pixel encryption comprises any one of a number of encryption techniques which render pixel information unusable without the corresponding pixel decryption processing. Lip sync modification comprises a change in synchronization of the video and associated audio information based upon a random or predetermined temporal parameter such that video and audio are no longer synchronized, thereby severely degrading the presentation of the audio video information stream. Audio suppression comprises techniques for suppressing or otherwise hiding audio information from a downstream audio decoder, such that the audio information may only be retrieved by a decoder cognizant of the new location or encoding technique used to hide the audio information. Chroma stripping comprises a process for removing or hiding chrominance information from a downstream video decoder, such that the chrominance information may be retrieved only by decoder cognizant of the location or technique used to hide the chrominance information. The routine 300 then proceeds to step 306.

At step 306 the audio video information stream is segmented into a plurality of contiguous information stream segments. These segments may be determined with respect to scene cut indicia, temporal displacement parameters, frame counts, GOP structure and the like. The segments may be of the same or substantially the same length or the segments may be of variable lengths. Each segment is associated with a segment identifier such that the original segment arrangement may be preserved by storing segment identifiers with a stream index table. The routine 300 then proceeds to step 308.

At step 308 the segments are compressed according to, e.g., MPEG-2 video and related audio compression techniques. Since the stream segments produced at step 306 are typically self contained with respect to buffer behavior, the compression processes utilized at step 308 may be performed in parallel. That is, multiple audio visual stream segments may be compressed in parallel using a parallel processing or parallel encoding technique. Otherwise, a single MPEG or other compression module may be used to process each stream segment in a standard manner to produce a compressed output stream comprising a plurality of compressed stream segments. The routine 300 then proceeds to step 310. At step 310 the compressed stream segments are re-sequenced (i.e., "shuffled") to produce a re-sequenced compressed audio video information stream and associated index table. The index table includes information relating the re-sequenced segments to the initial sequence of segments such that the re-sequenced information stream segments may be rearranged to produce the initial stream segment order. The routine 300 then proceeds to step 312.

At step 312 each of the re-sequenced information stream segments are encrypted to produce an information stream comprising a plurality of encrypted, re-sequenced information stream segments. The routine 300 then proceeds to step 314, where the index table used to maintain inter-segment associations is itself encrypted. The routine 300 then proceeds to step 316. At step 316 the encrypted information stream segments and the encrypted index table are distributed via, e.g., an information distribution network. The routine 300 then proceeds to step 318 where it is exited.

Figure 4:
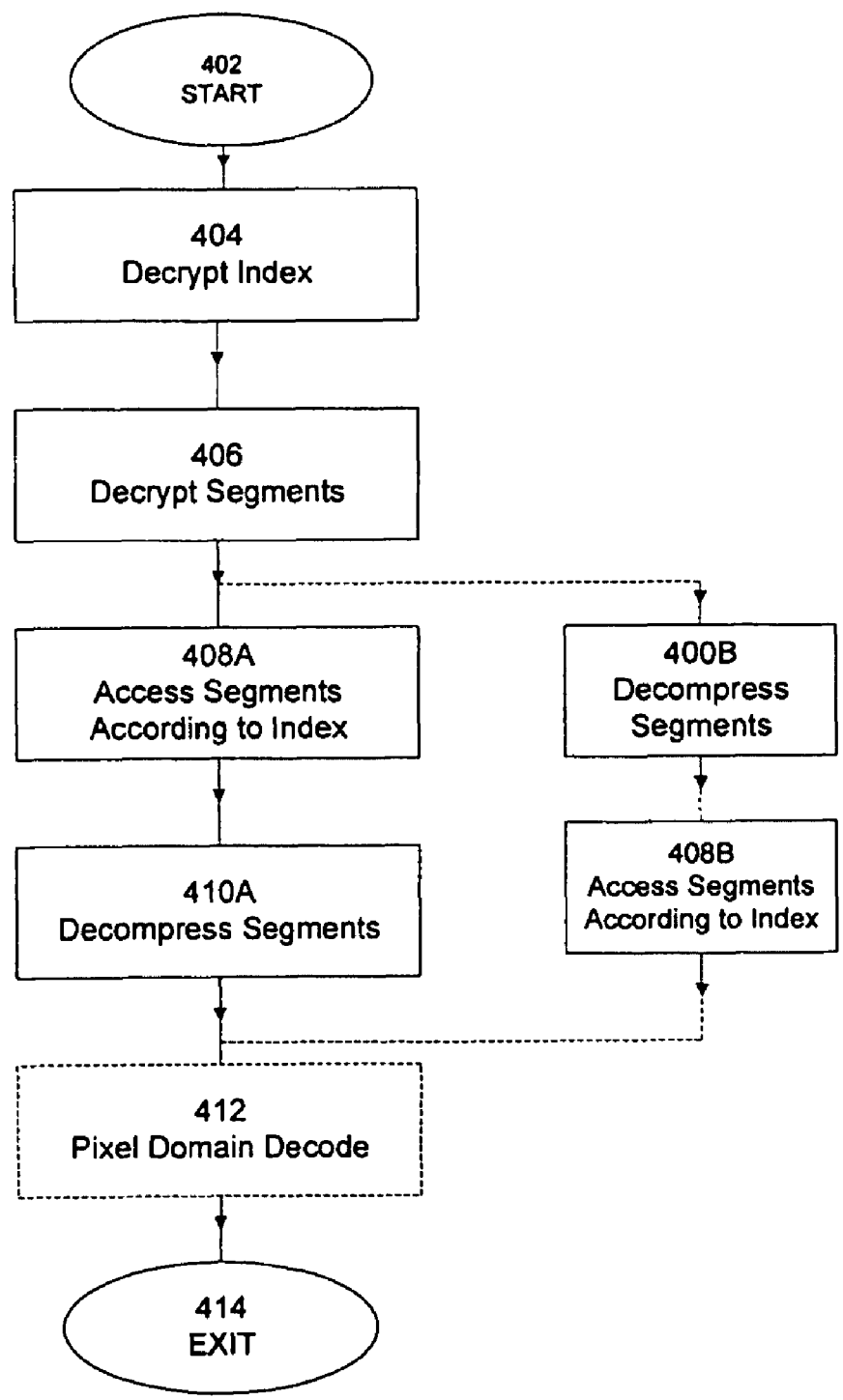
FIG. 4 depicts a flow diagram of a subscriber side method for processing an information stream according to the invention.

FIG. 4 depicts a flow diagram of a subscriber side method for processing an information stream according to the invention. Specifically, the routine 400 of FIG. 4 is directed towards processing a received encrypted index table and encrypted information segments to extract a properly sequenced audio visual information stream for subsequent presentation. The routine 400 is entered at step 402 and proceeds to step 404.

At step 404 an encrypted index table received via a distribution network is decrypted to provide a usable index table. The routine 400 then proceeds to step 406, where a plurality of encrypted information stream segments are decrypted to produce decrypted information stream segments. It must be noted that the decrypted information stream segments are not in a correct sequence with respect to the underlying audio visual information. That is, the decrypted information segments are "shuffled" such that presentation of the encrypted information stream segments (after, of course, decompression) would result in an undesirable choppy, temporally discontinuous audio visual presentation. The routine 400 then proceeds to step 408.

At step 408 the decrypted information stream segments are accessed according to information within the decrypted index table. Specifically, the decrypted index table indicates a correct temporal order or sequence for the decrypted information stream segments. Decrypted information stream segments are retrieved from, e.g., a local storage module in a correct temporal or sequential order as indicated by the decrypted index table to produce a properly sequenced compressed information stream. The routine 400 then proceeds to step 410, where the properly sequenced compressed information stream is decompressed to produce a decompressed audio visual information stream. For example, the decompression process at step 410 is the inverse of the compression process used at step 308 of the routine 300 of FIG. 3. The routine 400 then proceeds to step 412.

At step 412 an optional pixel domain decoding process is used to decode any pixel domain encoding imparted to the information stream at step 304 of the routine 300 of FIG. 3. The routine 400 then proceeds to step 414, where it is exited.

The above-described invention simultaneously provides for both flexibility and security of electronically stored video information. The essential observation is that, if compressed in an appropriate manner, video information that is stored on a random access storage device can be re-sequenced with respect to its presentation flow. In normal operation, compressed video typically cannot be chopped up and stored in segments, because the use of bi-directional motion prediction and the constraints of neither overflowing nor underflowing rate buffers prohibit such operation. However, the MPEG-2 syntax does provide mechanisms to treat portions of the video stream as self-contained entities. These mechanisms include the use of I and P frame GOP structures (e.g., "IPPPPPPI . . . ") or other "closed" GOP structures (e.g., "IBBPBBPI . . . ") and the use of splice point syntax that indicates periodic points at which buffers are filled to a known state. The invention provides an overall system that including both flexibility and security.

It must be noted that if the segments are not self contained (e.g., not a closed GOP data structure), the VBV buffer status at the boundaries would provide information to greatly assist in breaking the scrambling and reassembling of the proper video or audio sequence without the decrypted index.

It is important to note that the invention addresses the security weaknesses associated with continuity indicators, such as audio continuity, VBV buffer status, PTS and DTS information and the like. These continuity indicators are useful to those seeking to break the security of the system and retrieve the "secured" data. By isolating or encapsulating such continuity indicators within a segment, and then encoding the segment, the continuity indicators are not useful in decoding the segment.

Figure 5:
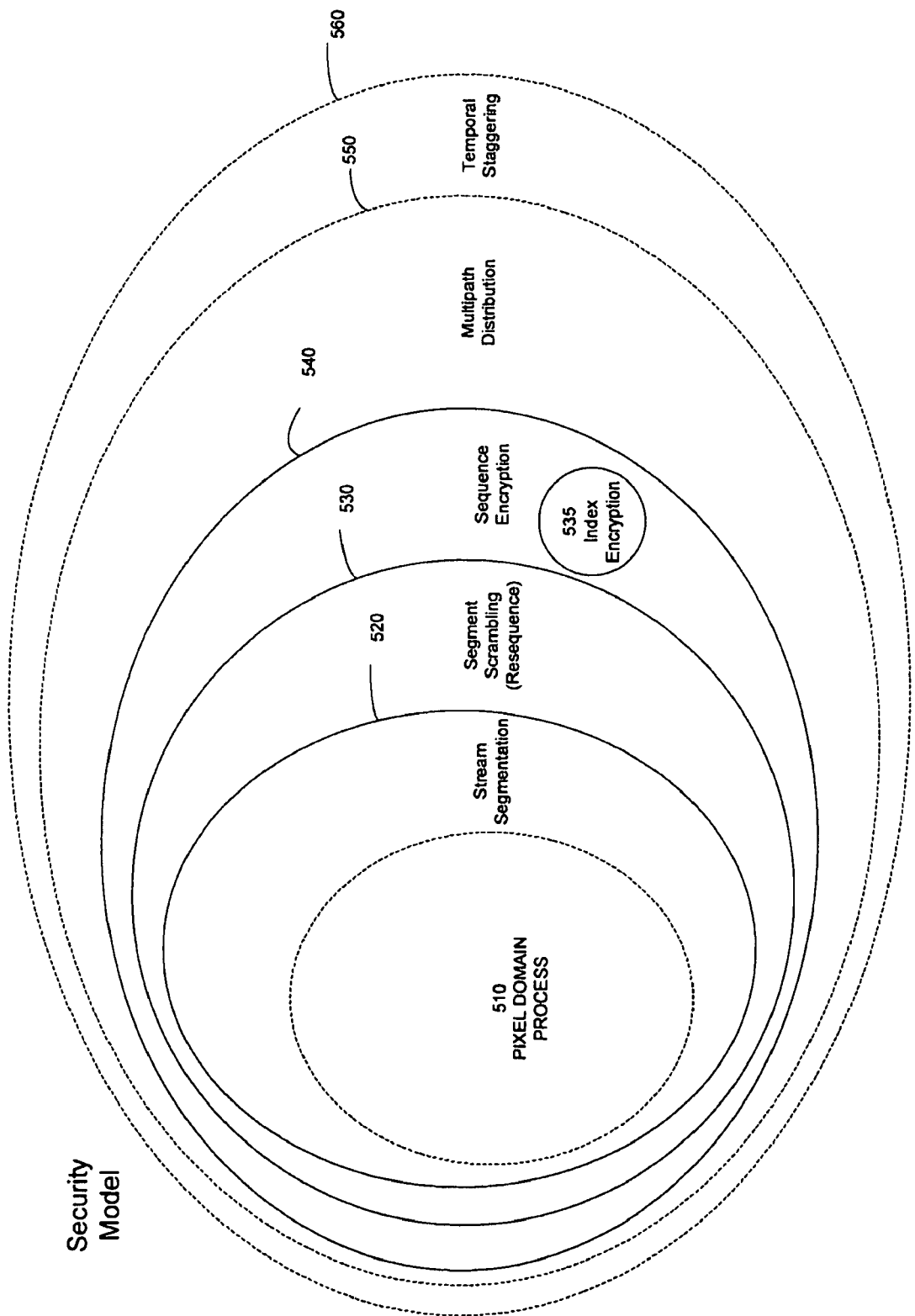
FIG. 5 depicts a diagrammatic representation of the a layered security environment enabled by the invention.

FIG. 5 depicts a diagrammatic representation of the a layered security environment enabled by the invention. Specifically, FIG. 5 depicts a series of concentric circles representative of security layers. The various layers of security have been described in detail above with respect to FIGS. 1-4. FIG. 5 is useful in understanding the holistic, yet flexible approach to security that is enabled by the invention.

Specifically, a first layer of security is provided by a pixel domain or other baseband information domain (e.g., audio or data domain) processing layer 510. As previously discussed, the exemplary pixel domain process may comprise, e.g., digital watermarking of video information, insertion of copyright notices and other pixel domain security measures. In the case of an information stream comprising an audio information stream or other information stream, the pixel domain process will, of course, comprise an audio domain process or other data domain process.

The security aspects of the pixel domain processing layer 510 are augmented by a stream segmentation processing layer 520. The security aspects of the stream segmentation processing layer 520 are augmented by a stream segment scrambling or re-sequencing layer 530. The security aspects of the stream segment scrambling or re-sequencing layer 530 are augmented by an encryption layer 540, including an optional index encryption layer 535.

In addition to the above-described security layers 510-540, two additional optional security layers are provides. The first of the additional optional layers comprises a multipath distribution layer 550, in which an information stream processed according to one or more of processing steps 510 through 540 is transmitted or distributed to one or more users via multiple signal paths. For example, the encrypted index produced at step 535 may be transmitted via a different signal path or medium than the encrypted sequence of segmented or re-scrambled information frames produced at step 540.

The second of the additional optional layers comprises a temporal staggering layer 560, in which portions of the information stream processed according to one or more of processing steps 510 through 540 is transmitted to one or more information consumers in a temporarily noncontiguous manner. That is, contiguous information stream segments are transmitted at different times (i.e., in temporally noncontiguous manner) and temporally reassembled by the information consumer(s).

In the case of a single transmission channel, the temporal staggering security layer 560 cannot be used for real time distribution of secure information streams due to the inherent nature of temporal staggering (i.e., inherently not real time using a single channel). However, temporal staggering coupled with multipath distribution may be used to distribute real time information streams. For example, if three distinct communication channels are used to distribute encrypted information segments, then each of the three channels may be used to distribute encrypted information segments offset by three segments from the information segment previously transmitted on that channel. From the perspective of a single channel, each of the transmitted information segments is temporally offset from a preceding or following information stream segment by the time normally associated with transmitting the two intervening information stream segments (i.e., the time normally allocated to transmitting the two information stream segments carried by the other two channels is not used by the one channel). Optionally, this dead time may be filled with dummy information or information likely to cause errors or otherwise help thwart an unauthorized user.

In one embodiment of the invention, one or more information distribution channels are used to transmit a plurality of segmented information streams. In this embodiment of the invention, the information segments associated with each of the plurality of segmented information streams are interleaved across the one or more information to be transmitted are interleaved among one or more information distribution channels. The segmented information streams may optionally share encryption keys. The interleave method may be fixed or dynamic. In the case of a dynamic interleave method, information suitable for reconstructing the various information streams may be provided within one or more index tables.

While the amount of security afforded by an individual security layer is roughly represented by the relative position of the individual security layer, it must be noted that each layer addresses a different security threat. For example, the pixel domain (or, more generally, the baseband information domain) layer is addresses the identification and/or tracing of unauthorized information stream use and/or users. The segment scrambling and encryption layers address the threat of hackers or other unauthorized users gaining access to useful data within a received information stream. The multiple channel transmission and temporal staggering layers address the physical avoidance of information stream reception by unauthorized users. The entire layered approach is directed toward providing selective layers of security, depending upon, e.g., the sensitivity of the information to be distributed. For example, securing an electronic program guide may be deemed to be unnecessary. However, securing a first run movie distributed to theaters for subsequent presentation is absolutely necessary.

Although various embodiments which incorporate the teachings of the present invention have been shown and described in detail herein, those skilled in the art can readily devise many other varied embodiments that still incorporate these teachings.

What is claimed is:

1. An apparatus for recovering image frames from an information stream, comprising:
    a memory for storing encrypted information stream segments transported by a distribution network;
    a recovering module for recovering an index relating a second segment sequence to a first segment sequence;
    a decrypting module for decrypting the encrypted information stream segments to produce corresponding decrypted information stream segments;
    a re-sequencing module for re-sequencing, using said recovered index, said decrypted information stream segments; and
    a decompression module for decompressing, after said re-sequencing using a prediction-based decompression process associated with said compression process, said compressed image frames included within said decrypted information stream segments.

2. The apparatus of claim 1, wherein:
    said encrypted re-sequenced information stream is received via a first medium; and
    said encrypted index is received via a second medium.

3. The apparatus of claim 2, wherein said encrypted and re-sequenced information stream segments are received in a temporally discontinuous manner.

4. The apparatus of claim 1, wherein said re-sequencing module further comprises:
an accessing module for accessing, from a random access storage containing at least some of said decrypted information stream segments, said decrypted information stream segments according to said first segment sequence.

5. The apparatus of claim 1, wherein said re-sequencing module further comprises:
an accessing module for accessing, from a random access storage containing at least some of said encrypted information stream segments, said encrypted information stream segments according to said first segment sequence.

6. An apparatus for recovering an information stream having a first segment sequence from an encrypted re-sequenced information stream having a second segment sequence, comprising:
a memory for storing encrypted information segments transported by a distribution network;
a recovering module for recovering an index relating said second segment sequence to said first segment sequence;
a decrypting module for decrypting said encrypted information segments to form respective decrypted information segments;
a re-sequencing module for re-sequencing, using said recovered index, said decrypted information segments to form an information stream comprising a plurality of image segments arranged according to said first segment sequence; and
a decompressing module for decompressing after said re-sequencing a plurality of image frames forming each of said information stream segments by employing prediction-based decompression.

7. A processor-based method of providing an information stream comprising a sequence of image frames to one or more consumers, comprising:
receiving an encrypted re-sequenced information stream and an index, wherein the encrypted re-sequenced information stream and index are generated by:
segmenting said information stream into a plurality of information stream segments having a first segment sequence, each of said information stream segments comprising a plurality of image frames;
compressing said image frames after said segmenting step by employing prediction-based compression;
re-sequencing said information stream segments to produce a re-sequenced information stream having a second segment sequence, said first segment sequence being related to said second segment sequence by an index; and
encrypting said re-sequenced information stream and said index; and
distributing said encrypted re-sequenced information stream and said index to one or more information consumers.

8. The method of claim 7, wherein, said step of distributing comprises the steps of:
distributing, via a first medium, said encrypted re-sequenced information stream; and
distributing, via a second medium, said encrypted index.

9. The method of claim 8, wherein said encrypted and re-sequenced information stream segments are distributed to said one or more information consumers in a temporally discontinuous manner.

10. The method of claim 9, wherein said encrypted and re-sequenced information stream segments are distributed to said one or more information consumers in a temporally discontinuous manner.

11. The method of claim 10, wherein:
said first medium comprises a plurality of distribution channels, each of said plurality of distribution channels distributing a respective plurality of said encrypted and re-sequenced information stream segments.

12. The method of claim 7, wherein:
each of said information stream segments comprises a first number of compressed image frames.

13. The method of claim 12, wherein:
in the case of an information stream segment including one or more predictively encoded compressed image frames, said one or more predictively encoded compressed image frames being predictively encoded using reference image frames within said information stream segment including said one or more predictively encoded compressed image frames.

14. The method of claim 7, wherein:
a first compressed image frame within each of said information stream segments comprises an intra coded frame.

15. The method of claim 7, wherein:
said information stream comprises a plurality of image frames and associated audio frames; and
each of said information stream segments includes a respective first plurality of image frames and a respective second plurality of audio frames, said first plurality of image frames and said second plurality of audio frames intended for presentation during substantially the same temporal period.

16. The method of claim 7, wherein said information stream comprises a plurality of image frames and associated audio frames, and wherein said step of segmenting comprises the steps of:
segmenting said information stream into a plurality of image information stream segments having said first segment sequence, each of said image information stream segments comprising a plurality of image frames;
segmenting said information stream into a plurality of audio information stream segments having a third segment sequence, each of said audio information stream segments comprising a plurality of audio frames.

17. The method of claim 16, wherein said step of re-sequencing comprises the steps of:
re-sequencing said image information stream segments to produce a re-sequenced image information stream having said second segment sequence, said first segment sequence being related to said second segment sequence by said index; and
re-sequencing said audio information stream segments to produce a re-sequenced audio information stream having said fourth segment sequence, said third segment sequence being related to said fourth segment sequence by said index.

18. The method of claim 17, wherein said image information stream and said audio information stream are encrypted using at least one of:
a common encryption technique using a common encryption key; different encryption keys using said common encryption technique; different encryption techniques using said common encryption key; and said different encryption techniques using said different encryption keys.

19. The method of claim 7, wherein said step of encrypting includes a step of encrypting an indicia of buffer behavior.

20. An apparatus comprising:
- a segmenting means for segmenting an information stream into a plurality of information stream segments, said information stream segments arranged according to a first segment sequence, each of said information stream segments comprising a plurality of image frames;
- a compressing means for compressing said image frames after said segmenting step by employing prediction-based compression;
- a re-sequencing means for re arranging according to a second segment sequence, said information stream segments including said compressed image frames, said first segment sequence being related to said second segment sequence by an index;
- an encryption means for encrypting said re-sequenced information stream segments and said index; and
- a storage means for storing said re-sequenced information stream segments.

21. The apparatus of claim 20, wherein:
said index is distributed to one or more information consumers via a first distribution channel; and
said encrypted and re-sequenced information stream segments are distributed to said one or more information consumers via a second distribution channel.

22. The apparatus of claim 21, wherein:
said encrypted and re-sequenced information stream segments are distributed to said one or more information consumers in a temporally discontinuous manner.

23. The apparatus of claim 21, wherein:
said second distribution channel comprises a plurality of distribution channels, each of said plurality of distribution channels distributing a respective plurality of said encrypted and re-sequenced information stream segments.

* * * * *